United States Patent Office 3,005,022
Patented Oct. 17, 1961

3,005,022
PROCESS FOR THE PRODUCTION OF SULFONYLUREAS
William M. McLamore, Kew Gardens, and Gerald D. Laubach, Jackson Heights, N.Y., assignors to Chas. Pfizer & Co., Inc., Brooklyn, N.Y., a corporation of Delaware
No Drawing. Filed Jan. 28, 1958, Ser. No. 711,570
5 Claims. (Cl. 260—553)

This invention relates to a novel method for preparing sulfonylureas and it is particularly concerned with a process for the production of sulfonylureas having the general formula $RSO_2NHCONHR'$ wherein R is an aryl group and R' is a lower alkyl, lower alkenyl or cycloalkyl group or it is an aryl group.

In accordance with the prior art, a number of methods have been suggested for preparing sulfonylureas. For instance, there is described in U.S. patent application Ser. No. 660,064, filed on May 20, 1957, a process for preparing arylsulfonylureas from the corresponding arylsulfonamides by contacting the latter compounds with the appropriate organic isocynanate; it should be noted that in some instances the yield of product may range as low as 20%. Furthermore, the use of other classical procedures described in the chemical literature is often extremely inconvenient inasmuch as the yields afforded by them are very poor and difficulty is often encountered in the isolation of the desired product; in addition, many of them have the further disadvantage of being non-economical in view of the use of expensive reagents which they entail; and finally, the isocyanate starting materials employed in these prior art methods are difficult to store and handle in view of their toxicity and volatility, as well as their general instability to such agents as water, alcohols, amines, and the like.

In accordance with the present invention, it has been unexpectedly discovered that an N'-substituted arylsulfonylurea as defined above can be prepared in substantially high yields by treating an alkali metal or alkaline-earth metal salt of an arylsulfonamide with an N,N-diaryl-N'-monosubstituted urea in an inert polar organic solvent medium. In particular, this invention affords a new and useful process for the production of a compound having the general formula $RSO_2NHCONHR'$ wherein R is a phenyl, p-fluorophenyl, p-chlorophenyl, p-bromophenyl, p-nitrophenyl, p-acetylaminophenyl, p-tolyl, p-anisyl, 2,4-dimethylphenyl, 2,5-dimethylphenyl, 3,4-dichlorophenyl or 3-chloro-p-tolyl group and R' is a phenyl, p-chlorophenyl, p-bromophenyl, p-tolyl or p-anisyl group or a lower alkyl group having from one to ten carbon atoms, or it is a lower alkenyl group having from three to eight carbon atoms or a cycloalkyl group having from three to six carbon atoms or cycloalkyalkyl group having from four to nine carbon atoms. These compounds are of therapeutic value in view of their hypoglycemic activity; N-(p-chlorobenzenesulfonyl)-N'-n-propylurea is particularly effective in this regard, being an excellent oral antidiabetic agent.

The process of this invention comprises contacting the corresponding sulfonamide in the form of its alkali metal or alkaline-earth metal salt with a trisubstituted urea having the general formula $(R'')_2NCONHR'$ wherein R' is defined as aforesaid and R'' is described as hereinafter. The herein described reaction of this process is suitably illustrated by the following equation wherein R is an aryl group having the same meaning as previously stated:

$RSO_2NH_2 + (R'')_2NCONHR' \rightarrow$
$RSO_2NHCONHR' + (R'')_2NH$

Inasmuch as the products produced by the process of this invention are known to have utility as medicinal agents for reducing blood sugar levels, a convenient and economic process for their production is of tremendous value to the public in general. The particular advantages offered by the process of this invention are manifold: the yields of sulfonylurea produced are of the order of 85–95%; the reagents, preferably a sulfonamide alkali metal or alkaline-earth metal salt and the appropriately trisubstituted urea, are relatively cheap and easily prepared; and control of the reaction conditions in this process is neither difficult nor is expensive equipment required.

In accordance with the process of this invention, a monoalkali or alkaline-earth metal sale of an arylsulfonamide having the previously defined general formula $RSO_2NH_2$ and preferably the monosodium salt thereof, is reacted in an inert polar organic solvent medium with a trisubstituted urea having the general formula $(R'')_2NCONHR'$ wherein R'' is defined as a phenyl, p-chlorophenyl, p-bromophenyl, p-nitrophenyl, p-tolyl, p-anisyl, α-naphthyl or β-naphthyl group, at a temperature in the range of from about 20° C. to about 150° C. for a time period of about 0.5 to about 18 hours, and the desired sulfonylurea is recovered in solid form. The inert polar organic solvent is preferably selected from the class consisting of N,N-di-lower alkyl substituted derivatives of lower aliphatic hydrocarbon carboxamides and lower dialkyl sulfoxides and sulfones; preferred N,N-di-lower alkyl substituted derivatives of lower aliphatic hydrocarbon carboxamides include dimethylformamide, diethylformamide, dimethylacetamide, diethylacetamide, and the like; preferred lower dialkyl sulfoxides include dimethyl sulfoxide, diethyl sulfoxide, di-isopropyl sulfoxide, di-n-propyl sulfoxide, and the like, while preferred lower dialkyl sulfones include dimethyl sulfone, diethyl sulfone, di-isopropyl sulfone, di-n-propyl sulfone, and the like. It is desirable that the inert polar organic solvent be present in sufficient amount to dissolve the sulfonamide salt and trisubstituted urea starting materials. Recovery of the desired sulfonylurea is most conveniently accomplished by first diluting the reaction solution with water, adjusting the pH of the resulting aqueous solution until it is basic and then subsequently extracting the basic aqueous solution with a water-immiscible organic solvent in order to remove the secondary amine by-product; the product of this invention is then conveniently isolated from the basic aqueous layer by the addition thereto of an acid in such amount that precipitation of the sulfonylurea occurs.

A specific embodiment of the process of the present invention involves the utilization of a monosodium salt of the sulfonamide in the inert polar organic solvent medium. The amount of the monoalkali metal salt of the sulfonamide employed is such that the molar ratio of sulfonamide to the trisubstituted urea is preferably in the range of from about 1:1 to about 1:3, although substantially equimolar ratios afford satisfactory results. It should be noted that an excess of the trisubstituted urea is preferably employed inasmuch as this not only aids in shifting the equilibrium to the product side of the equation, but it is also advantageous in that excess trisubstituted urea is easily removed after completion of the reaction as stated above.

Recovery of the desired products of this invention is, as previously mentioned, readily accomplished. For instance, the reaction solution is first diluted with water in an amount that is at least ten times the volume of said reaction mixture, and the resulting aqueous solution or layer (which is first separated) is then adjusted to a pH value greater than pH 8.0 by addition of any suitable base, i.e., an alkali metal or alkaline earth metal hydroxide, carbonate or bicarbonate. Sodium hydroxide is preferably employed because of its relative availability and low cost, and a 10% aqueous sodium hydroxide solution is usually employed. Following the pH adjustment, the basic aqueous solution is then extracted with a water-immiscible organic solvent, such as a lower alkyl ether or a halogenated lower hydrocarbon solvent, in order to remove the corresponding diarylamine by-product; or alternatively, the secondary amine by-product may be removed from the basic aqueous medium by means of filtration if it is a solid material. The desired sulfonylureas, being somewhat acidic in nature, remain in the basic aqueous solution from which they can be suitably precipitated by the addition of any common acid, such as hydrochloric acid or glacial acetic acid. Purification of the product is then easily effected either by means of recrystallization from a non-polar organic solvent, such as benzene, toluene, xylene, and the like, or by means of reprecipitation of said product from a 5% aqueous sodium carbonate solution with a dilute mineral acid, such as dilute hydrochloric acid. The latter procedure would be the preferred method inasmuch as it can be carried out at room temperature, thus circumventing any decomposition of the product that might possibly take place at higher temperatures.

The starting materials necessary for the process of this invention are compounds which are either well known in the prior art or else they are commercially available or easily prepared in accordance with standard procedures described in the chemical literature. For example, the arylsulfonamides are easily obtained by ammonolysis of the corresponding sulfonylchlorides; the latter compounds are either prepared directly by treatment of the substituted parent aryl compounds with chlorosulfonic acid or they are prepared from the corresponding arylsulfonic acid sodium salts, many of which are commercially available. It should be noted that the alkali metal salts of the aforementioned sulfonamides can be very easily prepared by means of a simple procedure; for instance, by treating the sulfonamide in an anhydrous alkanol solvent medium with at least an equivalent amount of the desired alkali metal alkoxide at room temperature for several hours, almost quantitative yields of the desired starting material are afforded; the monoalkali metal salts of the sulfonamides so produced are then conveniently isolated from the reaction solution by means of precipitation with a suitable anti-solvent, e.g., any relatively non-polar organic solvent, such as diethyl ether, chloroform, etc. The corresponding alkaline-earth metal salts may be similarly prepared.

The other major starting material in the process of this invention, viz., the N,N-diaryl-N'-monosubstituted urea, may be readily prepared by means of the following reaction which is illustrated below in accordance with the procedure described by Reudel in the Recueil des Travaux Chimiques des Pays-Bas, vol. 33, page 64 (1914):

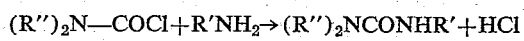

The two reactants stated in the above equation are either commercially available or else they are easily prepared by those skilled in the art from readily available starting materials according to classical organic procedures such as those presented by Houben-Weyl in "Die Methoden der organischen Chemie," 4th edition, vol. 8, page 117 (1952).

This invention is further illustrated by the following examples, which are not to be considered as imposing any limitations on the scope thereof.

*Example I*

A solution of 1.07 g. (0.005 mole) of the monosodium salt of p-chlorobenzenesulfonamide and 2.54 g. (0.01 mole) of N,N-diphenyl-N'-n-propylurea in 10 ml. of anhydrous dimethylformamide was heated on a steam bath for 16 hours. The amber-colored reaction solution was then cooled and diluted with 200 ml. of water, and the resulting aqueous solution was made strongly alkaline with 10% sodium hydroxide. Subsequent extraction of this alkaline solution with diethyl ether was then carried out in order to remove the diphenylamine by-product; the resulting aqueous layer was then filtered and the filtrate was slowly poured into a chilled solution of excess hydrochloric acid. The precipitated product so obtained was then collected by means of filtration, washed well with cold water and subsequently air dried. There were obtained 1.2 g. (88%) of a colorless crystalline material melting at 126–129° C. Further purification of this material, either by means of recrystallization from benzene or by reprecipitation from a 5% aqueous sodium carbonate solution with glacial acetic acid, afforded pure N-(p-chlorobenzenesulfonyl) - N' - n - propylurea, M.P. 129–129.8° C.; no appreciable depression in the melting point could be observed on admixture with an authentic sample of this material (mixed M.P. 127.5–129° C.).

*Anal.*—Calcd. for $C_{10}H_{13}ClN_2O_3S$: C, 43.40; H, 4.74; N, 10.12. Found: C, 43.19; H, 4.70; N, 10.32.

*Example II*

The procedure described in Example I was followed here except that other N,N-diphenyl-N'-substituted ureas were used in place of N,N-diphenyl-N'-n-propylurea. Thus, when p-chlorobenzenesulfonamide was reacted with N,N-diphenyl-N'-methylurea in accordance with the procedure previously described, the product obtained was N-(p-chlorobenzenesulfonyl)-N'-methylurea, M.P. 192.7–193.5° C.

*Anal.*—Calcd. for $C_8H_9ClN_2O_3S$: C, 38.64; H, 3.65. Found: C, 39.31; H, 3.70.

When the monosodium salt of p-chlorobenzenesulfonamide and N,N-di-phenyl-N'-ethylurea were reacted in the above manner, the product obtained was N-(p-chlorobenzenesulfonyl)-N'-ethylurea, M.P. 147.5–148° C.

*Anal.*—Calcd. for $C_9H_{11}ClN_2O_3S$: C, 41.14; H, 4.22. Found: C, 39.99; H, 4.15.

When the monosodium salt of p-chlorobenzenesulfonamide and N,N-diphenyl-N'-n-butylurea were reacted in the above manner, the product obtained was N-(p-chlorobenzenesulfonyl) - N' - n - butylurea, M.P. 104.2–104.8° C.

*Anal.*—Calcd. for $C_{11}H_{15}ClN_2O_3S$: C, 47.28; H, 5.62. Found: C, 47.47; H, 5.79.

When the monosodium salt of p-chlorobenzenesulfonamide and N,N-diphenyl-N'-t-butylurea were reacted in the above manner, the product obtained was N-(p-chlorobenzenesulfonyl)-N'-t-butylurea, M.P. 101.5–102° C.

*Anal.*—Calcd. for $C_{11}H_{15}ClN_2O_3S$: C, 47.28; H, 5.62. Found: C, 47.68; H, 5.81.

When the monosodium salt of p-chlorobenzenesulfonamide and N,N-diphenyl-N'-n-amylurea were reacted in the above manner, the product obtained was N-(p-chlorobenzenesulfonyl)-N'-n-amylurea, M.P. 115.8–116.4° C.

*Anal.*—Calcd. for $C_{12}H_{17}ClN_2O_3S$: C, 48.97; H, 6.01. Found: C, 50.00; H, 6.19.

When the monosodium salt of p-chlorobenzenesulfonamide and N,N-diphenyl-N'-cyclohexylurea were reacted in the above manner, the product obtained was N-(p-chlorobenzenesulfonyl) - N' - cyclohexylurea, M.P. 161–161.5° C.

*Anal.*—Calcd. for $C_{13}H_{17}ClN_2O_3S$: C, 49.28; H, 5.41; N, 8.84. Found: C, 49.14; H, 5.55; N, 8.76.

When the monosodium salt of p-chlorobenzenesulfonamide and N,N-diphenyl-N'-phenylurea were reacted in the above manner, the product obtained was N-(p-chlorobenezenesulfonyl)-N'-phenylurea; M.P. 179.5–180.4° C.

*Anal.*—Calcd. for $C_{13}H_{11}ClN_2O_3S$: C, 40.24; H, 3.57. Found: C, 50.47; H, 3.67.

Similarly, when N,N-diphenyl-N'-p-chlorophenylurea was used in place of N,N-diphenyl-N'-phenylurea, the product obtained was N-(p-chlorobenzenesulfonyl)-N'-p-chlorophenylurea, M.P. 182.5–183.2° C.

*Anal.*—Calcd. for $C_{13}H_{10}Cl_2N_2O_3S$: C, 45.23; H, 2.92. Found: C, 45.26; H, 2.90.

In the same manner, the monosodium salt of p-chlorobenzenesulfonamide and N,N-diphenyl-N'-p-tolylurea were reacted to afford N-(p-chlorobenzenesulfonyl)-N'-p-tolylurea, M.P. 176–177° C.

*Anal.*—Calcd. for $C_{14}H_{13}ClN_2O_3S$: C, 51.77; H, 4.03; N, 8.63. Found: C, 51.39; H, 4.04; N, 8.83.

Finally, the monosodium salt of p-chlorobenzenesulfonamide and N,N-diphenyl-N'-p-anisylurea were reacted in the above manner to afford a 98% yield of N-(p-chlorobenzenesulfonyl)-N'-p-anisylurea, M.P. 172–173° C.

*Anal.*—Calcd. for $C_{14}H_{13}ClN_2O_4S$: C, 49.34; H, 3.84, N, 8.22. Found: C, 49.41, H, 3.98, N, 8.38.

Example III

The procedure described in Example I was followed here except for the fact that the starting material employed was p-fluorobenzenesulfonamide. Thus, when this compound was reacted with N,N-diphenyl-N'-n-propylurea, the product obtained was N-(p-fluorobenzenesulfonyl)-N'-n-propylurea, M.P. 133–134° C. In a similar manner, p-fluorobenzenesulfonamide and N,N-diphenyl-N'-n-butylurea were reacted to afford N-(p-fluorobenzenesulfonyl)-N'-n-butylurea, M.P. 102.5–103.3° C.

*Anal.*—Calcd. for $C_{11}H_{15}FN_2O_3S$: C, 48.16; H, 5.51. Found: C, 48.36; N, 5.62.

Example IV

The procedure described in the previous example was followed here except for the fact that the monosodium salt of p-toluenesulfonamide was the starting material employed. Thus, when this compound was reacted with N,N-diphenyl-N'-n-propylurea in accordance with the above manner, there was obtained a 92% yield of N-(p-toluenesulfonyl)-N'-n-propylurea, M.P. 152–153° C.

*Anal.*—Calcd. for $C_{11}H_{16}N_2O_3S$: C, 51.54; H, 6.29; N, 10.93. Found: C, 51.54; H, 6.00; N, 10.92.

When the monosodium salt of p-toluenesulfonamide and N,N-diphenyl-N'-t-butylurea were reacted in the above manner, there was obtained a 79% yield of N-(p-toluenesulfonyl)-N'-t-butylurea; M.P. 164–165° C.

*Anal.*—Calcd. for $C_{12}H_{18}N_2O_3S$: C, 53.31; H, 6.71; N, 10.36. Found: C, 52.88; H, 6.77; N, 10.66.

When the monosodium salt of p-toluenesulfonamide and N,N-diphenyl-N'-cyclohexylurea were reacted in the above manner, there was obtained a 94% yield of N-(p-toluenesulfonyl)-N'-cyclohexylurea, M.P. 174–174.7° C.

*Anal.*—Calcd. for $C_{14}H_{20}N_2O_3S$: C, 36.73; H, 6.80; N, 9.45. Found: C, 56.68; H, 6.70; N, 9.55.

Example V

When the monosodium salt of benzenesulfonamide and N,N-diphenyl-N'-allylurea were reacted in accordance with the procedure described in Example I, the product obtained was N-benzenesulfonyl-N'-allylurea. In the same manner, the monosodium salt of p-chlorobenzenesulfonamide and N,N-diphenyl-N'-2-pentenylurea were reacted to afford N-(p-chlorobenzenesulfonyl)-N'-2-pentenylurea; the monosodium salt of p-bromobenzenesulfonamide and N,N-diphenyl-N'-2-octenylurea were reacted to afford N-(p-bromobenzenesulfonyl)-N'-2-octenylurea; the monosodium salt of p-toluenesulfonamide and N,N-diphenyl-N'-cyclopropylurea were reacted to afford N-(p-toluenesulfonyl)-N'-cyclopropylurea; the monosodium salt of p-methoxybenzenesulfonamide and N,N-diphenyl-N'-cyclopropylmethylurea were reacted to afford N-(p-methoxybenzenesulfonyl)-N'-cyclopropylmethylurea; the monosodium salt of p-acetylaminobenzenesulfonamide and N,N-diphenyl-N'-cyclopentylethylurea were reacted to afford N-(p-acetylaminobenzenesulfonyl)-N'-cyclopentylethylurea; and the monosodium salt of p-toluenesulfonamide and N,N-diphenyl-N'-cyclohexylpropylurea were reacted to afford N-(p-toluenesulfonyl)-N'-cyclohexylpropylurea.

Example VI

When the monosodium salt of p-chlorobenzenesulfonamide and N,N-diphenyl-N'-n-heptylurea were reacted in accordance with the procedure described in Example I, the product obtained was N-(p-chlorobenzenesulfonyl)-N'-n-heptylurea. In the same manner, the monosodium salt of benzenesulfonamide and N,N-diphenyl-N'-p-chlorophenylurea were reacted to afford N-(benzenesulfonyl)-N'-p-chlorophenylurea; the monosodium salt of p-bromobenzenesulfonamide and N,N-diphenyl-N'-n-decylurea were reacted to afford N-(p-bromobenzenesulfonyl)-N'-n-decylurea; the monosodium salt of p-toluenesulfonamide and N,N-diphenyl-N'-p-bromophenylurea were reacted to afford N-(p-toluenesulfonyl)-N'-p-bromophenylurea; the monosodium salt of p-nitrobenzenesulfonamide and N,N-diphenyl-N'-n-hexylurea were reacted to afford N-(p-nitrobenzenesulfonyl)-N'-n-hexylurea, and the monosodium salt of p-methoxybenzenesulfonamide and N,N-diphenyl-N'-n-octylurea were reacted to afford N-(p-methoxybenzenesulfonyl)-N'-n-octylurea. In every case, the yields obtained were substantially the same as those reported in Example I.

Example VII

The procedure described in Example I was followed here except for the fact that other N,N-diaryl-N'-substituted ureas were used in place of the corresponding N,N-diphenyl-N'-substituted urea. For instance, when N,N-di(p-chlorophenyl)-N'-n-propylurea was reacted with the monosodium salt of p-chlorobenzenesulfonamide, the product obtained was the same as that described in Example I, viz., N-(p-chlorobenzenesulfonyl)-N'-n-propylurea. In the same manner, N,N-di(p-tolyl)-N'-n-propylurea, N,N,-di(p-anisyl)-N'-n-propylurea, N,N-di-(α-naphthyl)-N'-n-propylurea and N,N-di(β-naphthyl)-N'-n-propylurea were all reacted with the monosodium salt of p-chlorobenzenesulfonamide to form the same product. In every case, the yields obtained were substantially the same as those reported in Example I.

Example VIII

When the monosodium salt of 2,4-dimethylbenzenesulfonamide and N,N-diphenyl-N'-n-propylurea were reacted in accordance with the procedure described in Example I, the product obtained was N-(2,4-dimethylbenzenesulfonyl)-N'-n-propylurea, M.P. 190–190.5° C.

*Anal.*—Calcd. for $C_{12}H_{18}N_2O_3S$: C, 53.31; H, 6.71; N, 10.36. Found: C, 53.18; H, 6.85; N, 10.62. In the same manner, the monosodium salt of 2,5-dimethylbenzenesulfonamide and N,N-diphenyl-N'-n-butylurea were reacted to afford N-(2,5-dimethylbenzenesulfonyl)-N'-n-butylurea, M.P. 190.2–191° C.

*Anal.*—Calcd. for $C_{13}H_{20}N_2O_3S$: C, 54.90; H, 7.09; N, 9.85. Found: C, 55.50; H, 7.13; N, 10.04. Similarly, the monosodium salt of 3,4-dichlorobenzenesulfonamide and N,N-diphenyl-N'-n-propylurea were reacted to afford N-(3,4-dichlorobenzenesulfonyl)-N'-n-propylurea, M.P. 145.5–146° C.

*Anal.*—Calcd. for $C_{10}H_{12}ClN_2O_3S$: C, 38.59; H, 3.89; N, 9.00. Found: C, 38.58; H, 3.90; N, 9.07. Finally, when the monosodium salt of 3-chloro-p-toluenesulfonamide and N,N-diphenyl-N'-n-butylurea were reacted in the above manner, the product obtained was N-(3-chloro-p-toluenesulfonyl)-N'-n-butylurea, M.P. 147–148° C.

*Anal.*—Calcd. for $C_{12}H_{17}ClN_2O_3S$: C, 47.28; H, 5.62; N, 9.19. Found: C, 47.53; H, 5.62; N, 9.17.

Example IX

The procedure described in Example I was followed here except that the monopotassium salt of p-chlorobenzenesulfonamide was employed in place of the corresponding monosodium salt. Thus, the monopotassium salt of p-chlorobenzenesulfonamide and N,N-diphenyl-N'-n-propylurea were reacted in accordance with this procedure; the product obtained was N-(p-chlorobenzenesulfonyl)-N'-n-propylurea. In the same manner, the monolithum salt of p-chlorobenzenesulfonamide and N,N-diphenyl-N'-n-propylurea were reacted to afford the identical product. In every case, the yields of product afforded were substantially of the same order of magnitude as those reported in Example I.

In addition, the calcium salt of p-chlorobenzenesulfonamide and N,N-diphenyl-N'-n-propylurea was reacted in accordance with the above procedure and the product obtained was N-(p-chlorobenzenesulfonyl)-N'-n-propylurea. In the same manner the strontium salt of p-chlorobenzenesulfonamide and the barium salt of p-chlorobenzenesulfonamide were both reacted with N,N-diphenyl-N'-n-propylurea and the product obtained was N-(p-chlorobenzenesulfonyl) - N' - n-propylurea. Again, the yields of product afforded in each case were about the same as those reported in Example I.

*Example X*

The procedures described in the foregoing examples were followed here except for the fact that the reaction was conducted in other inert polar organic solvents, such as diethylformamide, dimethylacetamide, diethylacetamide, dimethyl sulfoxide, diethyl sulfoxide, di-isopropyl sulfoxide, di-n-propyl sulfoxide, dimethyl sulfone, diethyl sulfone, di-isopropyl sulfone and di-n-propyl sulfone. In every case, the yields obtained were of the same order of magnitude as those reported in the previous examples.

What is claimed is:

1. The process which comprises contacting a compound selected from the group consisting of monoalkali metal and alkaline-earth metal salts of a sulfonamide having the formula $RSO_2NH_2$, wherein R is a member of the group consisting of phenyl, p-fluorophenyl, p-chlorophenyl, p-bromophenyl, p-nitrophenyl, p-acetylaminophenyl, p-tolyl, p-anisyl, 2,4-dimethylphenyl, 2,5-dimethylphenyl, 3,4-dichlorophenyl and 3-chloro-p-tolyl, in an inert polar organic solvent selected from the clas consisting of N,N-di-lower alkyl substituted derivatives of lower alkyl hydrocarbon carboxamides, lower dialkyl sulfoxides and lower dialkyl sulfones with a trisubstituted urea having the formula $(R'')_2NCONHR'$, wherein R' is a member of the group consisting of phenyl, p-chlorophenyl, p-bromophenyl, p-tolyl, p-anisyl, an alkyl group having from one to ten carbon atoms, an alkenyl group having from three to eight carbon atoms, a cycloalkyl group having from three to six carbon atoms and a cycloalkylalkyl group having from four to nine carbon atoms and R'' is a member of the group consisting of phenyl, p-chlorophenyl, p-bromophenyl, p-nitrophenyl, p-tolyl, p-anisyl, α-naphthyl and β-naphthyl, said process being conducted at a temperature in the range of from about 20° C. to about 150° C. for about 0.5 to about 18 hours.

2. The proces as claimed in claim 1 wherein the molar ratio of sulfonamide salt to trisubstituted urea is in the range of from about 1:1 to about 1:3.

3. The process as claimed in claim 1 wherein the inert polar organic solvent is dimethylformamide.

4. The process as claimed in claim 1 wherein the inert polar organic solvent is dimethylacetamide.

5. The process as claimed in claim 1 wherein the inert polar organic solvent is dimethylsulfoxide.

References Cited in the file of this patent

UNITED STATES PATENTS

| | | |
|---|---|---|
| 2,385,571 | Haack | Sept. 25, 1945 |
| 2,390,253 | Henke | Dec. 4, 1945 |
| 2,907,692 | Haack et al. | Oct. 6, 1959 |

FOREIGN PATENTS

| | | |
|---|---|---|
| 604,259 | Great Britain | June 30, 1948 |

OTHER REFERENCES

Finger et al., J. Am. Chem. Soc., vol. 78, pages 6034–6035 (1056).